United States Patent
Ide et al.

(10) Patent No.: US 10,761,360 B2
(45) Date of Patent: Sep. 1, 2020

(54) DISPLAY DEVICE AND METHOD FOR PRODUCING DISPLAY DEVICE

(71) Applicant: SHARP KABUSHIKI KAISHA, Sakai, Osaka (JP)

(72) Inventors: Tomoya Ide, Sakai (JP); Shigenori Morioka, Sakai (JP); Tokumi Hayashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/281,739

(22) Filed: Feb. 21, 2019

(65) Prior Publication Data

US 2019/0302513 A1 Oct. 3, 2019

(30) Foreign Application Priority Data

Mar. 30, 2018 (JP) .................................. 2018-069145

(51) Int. Cl.
   *G02F 1/00* (2006.01)
   *G02F 1/1333* (2006.01)
   *F21V 8/00* (2006.01)
   *G02F 1/133* (2006.01)

(52) U.S. Cl.
   CPC ..... *G02F 1/133382* (2013.01); *G02B 6/0085* (2013.01); *G02F 1/13306* (2013.01)

(58) Field of Classification Search
   CPC ........... G02F 1/133382; G02F 1/13306; G02B 6/0085
   See application file for complete search history.

(56) References Cited

U.S. PATENT DOCUMENTS

| | | | |
|---|---|---|---|
| 9,575,522 B2* | 2/2017 | Seo | ........................ G06F 1/203 |
| 2014/0085564 A1* | 3/2014 | Hendren | ........... G02F 1/133382 349/58 |
| 2018/0173044 A1* | 6/2018 | Lim | ..................... G02B 6/0085 |
| 2019/0049794 A1* | 2/2019 | Liu | .................... G02F 1/133608 |
| 2019/0196262 A1* | 6/2019 | Jin | ....................... G02B 6/0085 |

FOREIGN PATENT DOCUMENTS

JP          5635322 B2       12/2014

* cited by examiner

*Primary Examiner* — Y M. Quach Lee
(74) *Attorney, Agent, or Firm* — ScienBiziP, P.C.

(57) ABSTRACT

A display device includes: a display panel including a substrate and a display driving component mounted on the substrate; a backlight unit; and a heat dissipation member present on that surface of the substrate which is opposite to the region in which a display driving component is mounted and on that side of the backlight unit which is opposite to the display panel, the heat dissipation member being made of a highly thermally conductive material and having slits for discharging gas inside the heat dissipation member to outside the heat dissipation member.

5 Claims, 6 Drawing Sheets

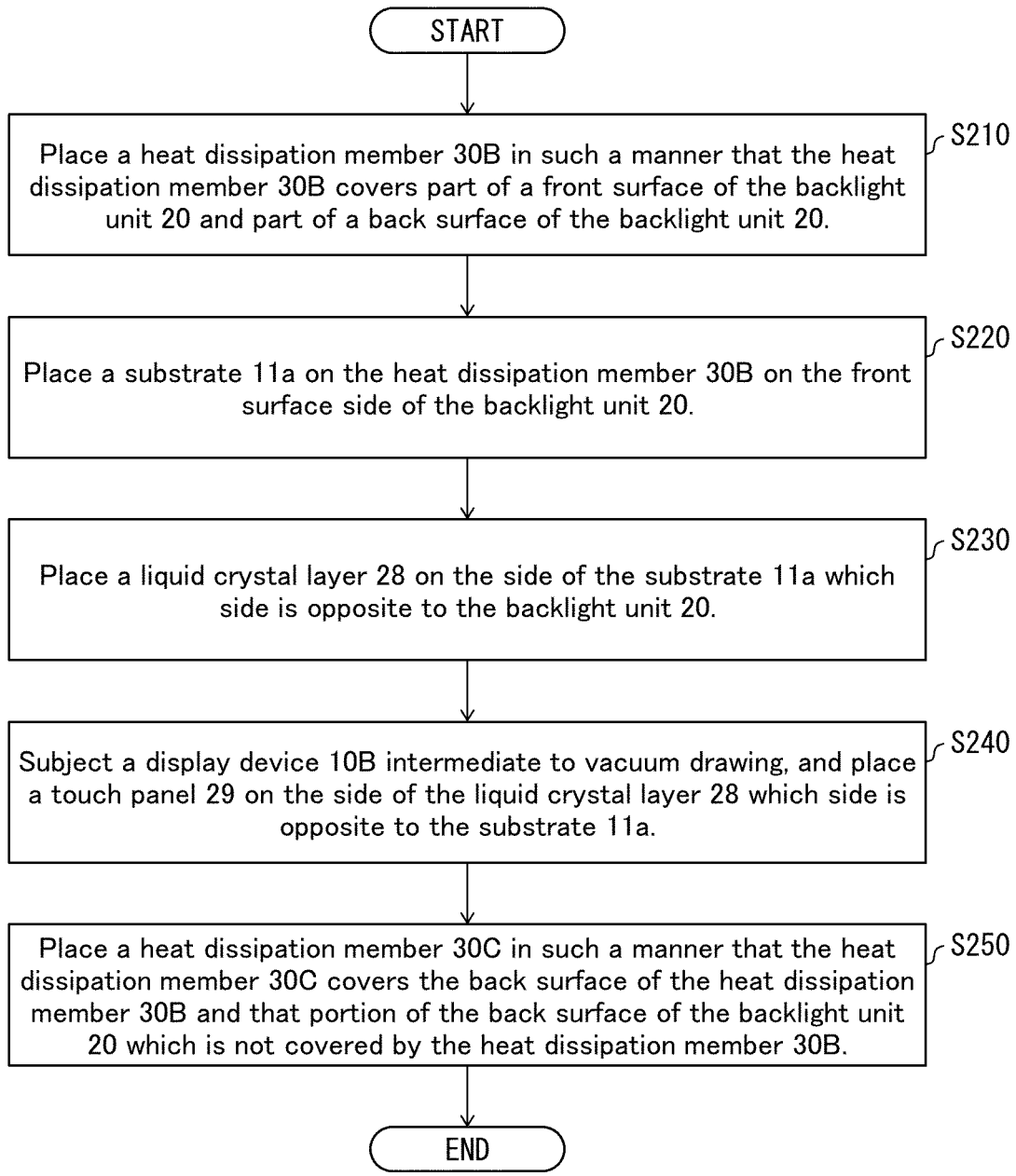

DISPLAY DEVICE AND METHOD FOR PRODUCING DISPLAY DEVICE

This Nonprovisional application claims priority under 35 U.S.C. § 119 on Patent Application No. 2018-069145 filed in Japan on Mar. 30, 2018, the entire contents of which are hereby incorporated by reference.

TECHNICAL FIELD

The present invention relates to a display device and a method for producing a display device.

BACKGROUND ART

There has been known a display device including a heat dissipation member for dissipating heat generated inside the display device. Patent Literature 1, for example, discloses a liquid crystal display device including (i) light-emitting diodes, (ii) a frame containing those light-emitting diodes, and (iii) a graphite composite film attached to a portion of the back surface of the frame which portion is opposite to a portion at which light-emitting diodes are present densely. This liquid crystal display device uses the graphite composite film to dissipate heat generated by the light-emitting diodes.

CITATION LIST

Patent Literature

[Patent Literature 1]
Japanese Patent Publication No. 5635322 (Registration date: Oct. 24, 2014)

SUMMARY OF INVENTION

Technical Problem

The liquid crystal display device disclosed in Patent Literature 1 involves the following issue: During production of the liquid crystal display device, when a yet-to-be-finished liquid crystal display device is subjected to vacuum drawing, the graphite composite film expands, which decreases the production yield. The graphite composite film expands as such because of gas contained therein.

An aspect of the present invention has an object of, when a yet-to-be-finished display device (hereinafter referred to as a "display device intermediate") is subjected to vacuum drawing, preventing the heat dissipation member from expanding and thereby improving the yield of production of the display device.

Solution to Problem

In order to attain the above object, a display device in accordance with an aspect of the present invention includes: a display panel including a substrate and a display driving component mounted on the substrate; a backlight unit including a light source and facing the substrate; and a heat dissipation member integrally including: a display panel coinciding portion on a surface of the substrate which surface is opposite to a region in which the display driving component is mounted; a light source coinciding portion present on a side of the backlight unit which side is opposite to the display panel; and a connecting portion connecting the display panel coinciding portion and the light source coinciding portion with each other, the heat dissipation member being made of a highly thermally conductive material and having slits for discharging gas inside the heat dissipation member to outside the heat dissipation member.

A display device in accordance with an aspect of the present invention includes: a display panel including a substrate and a display driving component mounted on the substrate; a backlight unit including a light source and facing the substrate; and a heat dissipation member integrally including: a display panel coinciding portion on a surface of the substrate which surface is opposite to a region in which the display driving component is mounted; a light source coinciding portion present on a side of the backlight unit which side is opposite to the display panel; and a connecting portion connecting the display panel coinciding portion and the light source coinciding portion with each other, the heat dissipation member being made of a highly thermally conductive material whose volume in a non-vacuum state is maintained in a vacuum state.

A method in accordance with an aspect of the present invention for producing a display device is a method for producing a display device including (i) a display panel including a substrate and a display driving component mounted on the substrate and (ii) a backlight unit including a light source and facing the substrate, the method including the steps of placing a heat dissipation member in such a manner that the heat dissipation member covers part of a front surface of the backlight unit and at least part of a back surface of the backlight unit; and placing the substrate on the heat dissipation member on a side of the front surface of the backlight unit, the heat dissipation member being made of a highly thermally conductive material and having slits for discharging gas inside the heat dissipation member to outside the heat dissipation member.

A method in accordance with an aspect of the present invention for producing a display device is a method for producing a display device including (i) a display panel including a substrate and a display driving component mounted on the substrate and (ii) a backlight unit including a light source and facing the substrate, the method including the steps of placing a heat dissipation member in such a manner that the heat dissipation member covers part of a front surface of the backlight unit and at least part of a back surface of the backlight unit; and placing the substrate on the heat dissipation member on a side of the front surface of the backlight unit, the heat dissipation member being made of a highly thermally conductive material whose volume in a non-vacuum state is maintained in a vacuum state.

Advantageous Effects of Invention

An aspect of the present invention makes it possible to, when a display device intermediate is subjected to vacuum drawing, prevent the heat dissipation member from expanding and thereby improve the yield of production of the display device.

BRIEF DESCRIPTION OF DRAWINGS

FIG. 6 is a flowchart that shows a method for producing the display device illustrated in FIG. 5.

DESCRIPTION OF EMBODIMENTS

Embodiment 1

Figure 1:
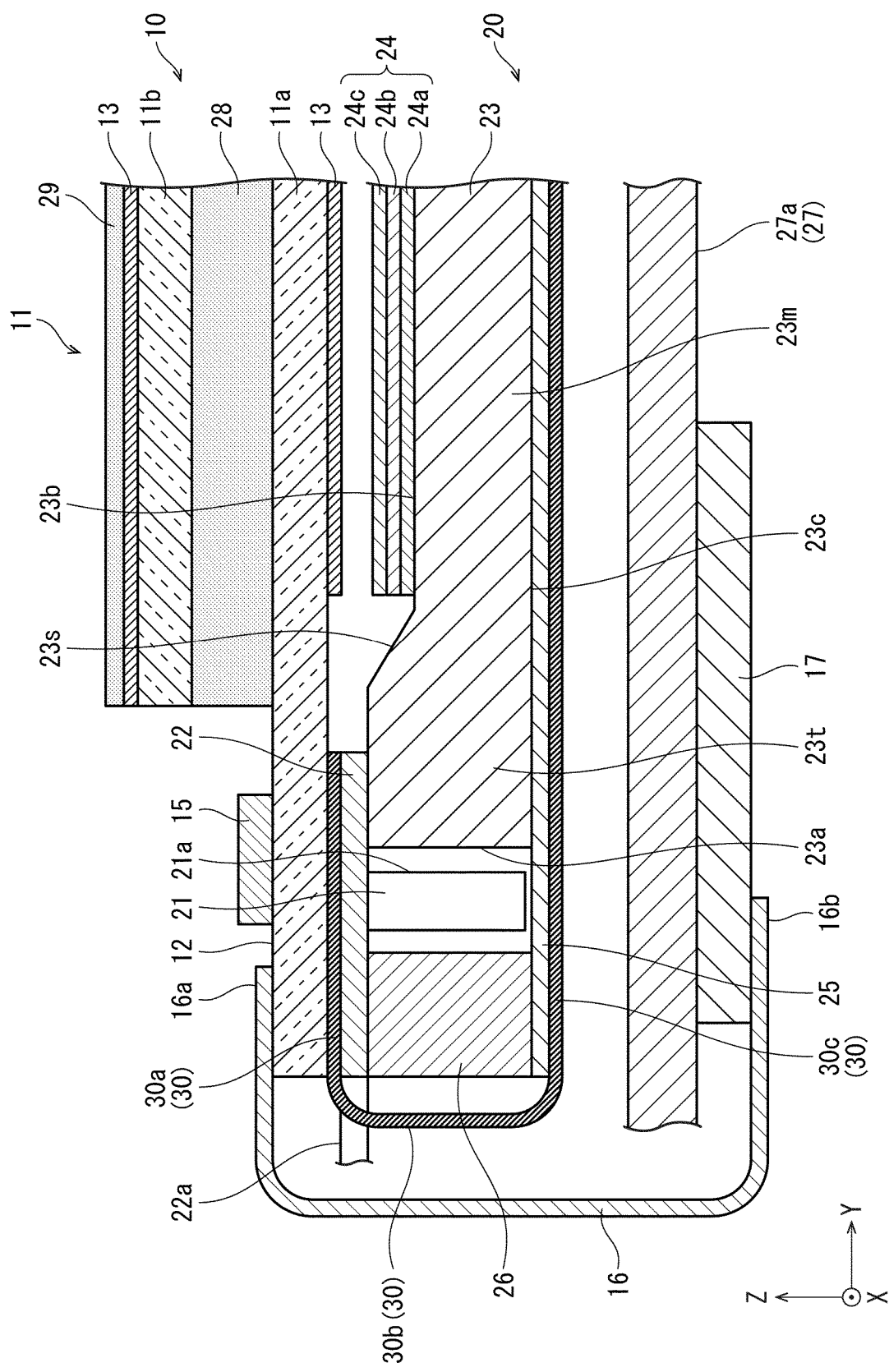
FIG. 1 is a cross-sectional diagram illustrating the configuration of a display device in accordance with Embodiment 1 of the present invention.

FIG. 1 is a cross-sectional diagram illustrating the configuration of a display device 10 in accordance with Embodiment 1 of the present invention. FIG. 1 shows an X axis, a Y axis, and a Z axis. The X axis extends in a direction orthogonal to the drawing. The Y axis extends in a direction from a light source 21 (described later) to a light guide plate 23 (described later). The Z axis extends in a direction from a backlight unit 20 (described later) to a display panel 11 (described later).

FIG. 1 serves as a reference of the up-down direction. The upper side of FIG. 1 is the front side of the display device 10, whereas the lower side of FIG. 1 is the back side of the display device 10. In other words, the front side of the display device 10 is the side of the display device 10 on which side the display panel 11 is present, whereas the back side of the display device 10 is the side of the display device 10 on which side a control circuit substrate 17 (described later) of the display device 10 is present.

The display device 10, as illustrated in FIG. 1, includes a display panel 11, a backlight unit 20, and a heat dissipation member 30, all of which are contained in a housing (not shown). The display device 10 is in the shape of a rectangular flat box as a whole. The display device 10 is used in any of various electronic devices such as portable information terminals, on-vehicle information terminals, and portable game devices. Examples of the portable information terminals include portable telephones, smartphones, and tablet computers. Examples of the on-vehicle information terminals include stationary car navigation systems and portable car navigation systems.

The display panel 11 may be, for example, a liquid crystal panel. The display panel 11 includes two substrates 11a and 11b, two polarizing plates 13, a liquid crystal layer 28, and a touch panel 29. The display panel 11 is capable of displaying an image. Specifically, the display panel 11 is capable of displaying an image with use of light emitted from the backlight unit 20. The display panel 11 lets light exit on the front side thereof.

The display panel 11 is in the shape of a rectangular plate as a whole, the short sides thereof extending along the X axis, the long sides thereof extending along the Y axis, the thickness direction thereof corresponding to the Z axis. The display panel 11 has a front surface that serves as a display surface, and has at a central portion of the display surface a display region (active area) in which an image is displayed. The display panel 11 has, at a peripheral portion surrounding the display region and having a frame shape (square or circular), a non-display region in which no image is displayed.

The display panel 11 is configured in a well-known manner such that a pair of rectangular substrates 11a and 11b face each other with a predetermined gap therebetween and that a liquid crystal layer 28 is positioned between the substrates 11a and 11b. The substrates 11a and 11b each include an excellently light-transmitting glass substrate made of, for example, no alkali glass or quartz glass. Each of the glass substrates is provided with a plurality of films disposed on top of each other by, for example, a known photolithography method (the details not shown).

The substrate 11a, that is, one of the pair of substrates which is positioned on the back side (that is, the lower side of FIG. 1), is an array substrate. The substrate 11a is provided with, for example, (i) source lines, (ii) gate lines orthogonal to the source lines, (iii) switching elements (for example, thin-film transistors [TFTs]) connected to the source lines and the gate lines, (iv) pixel electrodes connected to the switching elements, and (v) an alignment film (not shown).

The substrate 11b, that is, one of the pair of substrates which is positioned on the front side (that is, the upper side of FIG. 1), is a color filter (CF) substrate. The substrate 11b is provided with, for example, (i) a color filter in which colored portions with such colors as red (R), green (G), and blue (B) are arranged in a predetermined pattern, (ii) a counter electrode, and (iii) an alignment film (not shown). Components such as the counter electrode as well as the source lines and gate lines described above receive from the control circuit substrate 17 image data and various control signals necessary to display an image. The display panel 11 further includes (i) a polarizing plate 13 on the back surface side of the substrate 11a and (ii) a polarizing plate 13 on the front surface side of the substrate 11b.

The substrate 11b has (i) a width (that is, an X-axis dimension) equal to the width (that is, the X-axis dimension) of the substrate 11a and (ii) a length (that is, a Y-axis dimension) smaller than the length (that is, the Y-axis dimension) of the substrate 11a. The substrates 11a and 11b face each other in such a manner that the substrate 11a has, at a lengthwise end thereof (that is, an end in the Y-axis direction; the left-side end in FIG. 1), a substrate non-coinciding portion 12, which does not coincide with the substrate 11b over a predetermined lengthwise range. The substrate non-coinciding portion 12, in other words, extends in the shape of a belt in the widthwise direction (that is, the X-axis direction) of the display panel 11.

The display region described above is present at a portion at which the substrates 11a and 11b coincide with each other. The substrate non-coinciding portion 12 of the substrate 11a is entirely a non-display region. The substrate non-coinciding portion 12 (which is present at an end of the substrate 11a) supports a display driving component 15 (described later) and a flexible substrate 16 (described later) for signal transmission.

The backlight unit 20 is disposed on the back side of the display panel 11 (that is, faces the substrate 11a), and emits light for displaying an image on the display panel 11. The backlight unit 20 is, as a whole, substantially in the shape of a rectangular block as viewed from the front side.

The backlight unit 20 includes a light source 21, an LED substrate 22, a light guide plate 23, an optical sheet 24, a reflecting sheet 25, and a frame 26. The backlight unit 20 is of an edge-light type (side-light type) with one-side light entrance; specifically, the backlight unit 20 includes a light source 21 facing a widthwise end surface (that is, an end surface extending along the X axis) of the light guide plate 23 so that light enters the light guide plate 23 only from one side. The backlight unit 20 converts light from the light source 21 into planar light and emits the light toward the display panel 11 on the front side. This means that the backlight unit 20 emits light on the front side. The light source 21 is present at that end of the backlight unit 20 at which end the substrate non-coinciding portion 12 is present.

The light source 21 may be, for example, a light-emitting diode (LED). The light source 21 is mounted on the LED substrate 22, and emits light to the light guide plate 23. The backlight unit 20 may include a plurality of light sources 21. The light source 21 includes an LED chip as a semiconductor light-emitting element which LED chip is placed on a substrate section fixed to the surface of the LED substrate 22 and which LED chip is sealed up with a resin material.

The LED chip has a single main light emission wavelength. Specifically, the LED chip emits light having a single color of blue. The resin material, with which the LED chip is sealed up, contains a phosphor dispersed therein which phosphor is excited by blue light from the LED chip to emit light having a predetermined color. The resin material allows the light source 21 as a whole to emit generally white light. The light source 21 is of a side-surface light emission type: It has a side surface serving as a light emission surface 21a which side surface is adjacent to a surface in contact with the LED substrate 22.

The light source 21 emits light from the light emission surface 21a which light spreads to a predetermined degree (directivity) with the optical axis as the center. The present embodiment is arranged such that the optical axis of the light emitted is substantially perpendicular to a central portion of the light emission surface 21a.

The LED substrate 22 includes an insulating and flexible film (sheet), which serves as a base on which a plurality of light sources 21 are mounted at an interval. The LED substrate 22 is provided with a wiring pattern that is made of a metal film such as a copper foil and that serves to supply electric power to the light sources 21. The light sources 21 are mounted on the back-side surface (which is opposite to the display panel 11) of the LED substrate 22.

The LED substrate 22 has (i) a length (that is, X-axis sides) equal to the width (that is, the X-axis sides) of the light guide plate 23 and (ii) a width (that is, Y-axis sides) larger than the distance between the frame 26 and the light guide plate 23. The LED substrate 22 is disposed on the front side of the light guide plate 23 in such a manner that a first long side of the LED substrate 22 extends along a first short side of the light guide plate 23. The LED substrate 22 has a second long side on the front side of the frame 26. The LED substrate 22, in other words, extends in the widthwise direction of the backlight unit 20 (that is, the X-axis direction). The light source 21 faces the light guide plate 23 in such a manner as to have a light emission surface 21a parallel to the end surface (light entrance surface 23a) at the first short side of the light guide plate 23.

The light guide plate 23 guides light emitted from the light source 21. The light guide plate 23 is made of, for example, a transparent synthetic resin such as an acrylic resin or a polycarbonate. The light guide plate 23 is in the shape of a substantially rectangular plate as viewed from the front side. The light guide plate 23 has a length along the Y axis, a width along the X axis, and a thickness along the Z axis.

The light guide plate 23 has peripheral end surfaces, among which the left-side end surface at the first short side shown in FIG. 1 faces the light emission surface 21a of the light source 21 in such a manner as to be parallel to the light emission surface 21a thereof. The left-side end surface serves as a light entrance surface 23a, which receives light from the light source 21. The light guide plate 23 has a front surface that serves as a light exit surface 23b, which lets light be emitted toward the display panel 11. The light guide plate 23 has a back surface that serves as a reflective surface 23c, which reflects light traveling from a central portion of the light guide plate 23 toward the back surface so that the light travels toward the light exit surface 23b.

The light guide plate 23 includes a body 23m and a thick portion 23t. The thick portion 23t is present near the end on the side of the light entrance surface 23a. The thick portion 23t is thicker than the other portion (that is, the body 23m) across the entire X-axis dimension. The light guide plate 23 is capable of increasing the density of light from the light source 21 at the body 23m.

The thick portion 23t results from forming a light guide plate 23 in such a manner that a portion of the light exit surface 23b which portion is near the end on the side of the light entrance surface 23a is raised across the entire X-axis dimension. That portion of the light exit surface 23b which corresponds to the thick portion 23t is parallel to the reflective surface 23c. That portion of the light exit surface 23b which corresponds to the thick portion 23t is continuous via a slope portion 23s with that portion of the light exit surface 23b which corresponds to the body 23m. The slope portion 23s increases its height toward the light entrance surface 23a. The slope portion 23s is present in the non-display region. The LED substrate 22 is fixed to that portion of the light exit surface 23b of the light guide plate 23 which corresponds to the thick portion 23t.

That portion of the light exit surface 23b which corresponds to the body 23m of the light guide plate 23 is provided with an optical sheet 24. The optical sheet 24 is a flat, rectangular sheet. The optical sheet 24 has a length along the Y axis and a width along the X axis. The optical sheet 24 is disposed between the light guide plate 23 and the display panel 11 to (i) pass light from the light guide plate 23 through itself while imparting a predetermined optical property to the light and (ii) allow the light to travel toward the display panel 11.

The optical sheet 24 includes a diffusing sheet 24a, a lens sheet 24b, and a reflective polarizing sheet 24c that are disposed on top of one another in this order from the back side. The diffusing sheet 24a includes (i) a base including a substantially transparent synthetic resin and (ii) a large number of diffusing particles dispersed in the base material. The diffusing sheet 24a is in contact with the light guide plate 23, and is the closest to the light guide plate 23 among the components of the optical sheet 24.

The backlight unit 20 includes a reflecting sheet 25 on the back surface of the light guide plate 23 (that is, on the reflective surface 23c, which is opposite to the display panel 11). The reflecting sheet 25 has a surface made of a sheet material containing a white, excellently light-reflective synthetic resin. The reflecting sheet 25 causes light emitted from the reflective surface 23c to propagate efficiently through the light guide plate 23 toward the front side (that is, the light exit surface 23b). The reflecting sheet 25 is rectangular as viewed from the front side. The reflecting sheet 25 has a central portion that occupies most of the reflecting sheet 25 and that is in contact with the back surface of the light guide plate 23. The reflecting sheet 25 has a peripheral edge extending outward beyond the peripheral end surfaces of the light guide plate 23. This configuration allows that surface of the reflecting sheet 25 which is on the side of the LED substrate 22 to (i) efficiently reflect light that the surface receives directly from the light source 21 and thereby (ii) cause the reflected light to reach the light entrance surface 23a.

The frame 26 is made of a synthetic resin. The frame 26 is rectangular as a whole. The frame 26 has an outer diameter substantially equal to the outer diameter of the substrate 11a of the display panel 11 as viewed from the front side. The frame 26 has a height equal to the height of the thick portion 23t of the light guide plate 23. The frame 26 has a length along the Y axis, a width along the X axis, and a height along the Z axis.

The frame 26 has an upper surface on which the LED substrate 22 is disposed with an adhesive tape therebetween (not shown), and supports the LED substrate 22 from its back side. The frame 26 contains the light source 21 and the light guide plate 23. The frame 26 has a lower surface on which the reflecting sheet 25 is disposed with an adhesive tape therebetween (not shown). The frame 26 allows the above-described components of the backlight unit 20 to be fixed to one another and kept inside the frame 26.

The components of the backlight unit 20 are contained in the chassis 27. The chassis 27 is made of a metal material; for example, it is made from an aluminum plate or an electrogalvanized steel plate (SECC). The chassis 27 is, as a whole, substantially in the shape of a box that is rectangular as viewed from the front side and that is open toward the front side (not shown).

The chassis 27 includes (i) a bottom plate section 27a that is larger than the outer diameter of the frame 26 and that is substantially rectangular as viewed from the front side and (ii) a side wall (not shown) that stands at an edge of the bottom plate section 27a. The bottom plate section 27a has a length along the Y axis and a width along the X axis. The bottom plate section 27a has a back surface provided with components such as the control circuit substrate 17 for driving the above-described display driving component 15.

FIG. 1 illustrates the display driving component 15 and the flexible substrate 16 as being in contact with the substrate non-coinciding portion 12 of the substrate 11a of the display panel 11 disposed on the front side of the backlight unit 20.

The display driving component 15 includes an LSI (integrated circuit) chip containing a driving circuit. The display driving component 15 processes an input signal supplied via the flexible substrate 16 from the control circuit substrate 17 as a signal source and thereby generates an output signal. The display driving component 15 outputs an output signal to the display region of the display panel 11 to drive liquid crystal molecules as a display element. As the display driving component 15 is driven, the display driving component 15 generates heat.

The display driving component 15 is in the shape of a rectangular parallelepiped. The display driving component 15 is mounted on the substrate non-coinciding portion 12 of the substrate 11a of the display panel 11 in such a manner as to have a length extending along the X axis and a width extending along the Y axis.

The flexible substrate 16 includes a base that is made of an insulating and flexible synthetic resin such as a polyimide or a polyethylene terephthalate (PET) and that is in the shape of a rectangular sheet as viewed from the front side. The base is provided with a wiring pattern (not shown) including a large number of lines. This configuration allows the flexible substrate 16 to have a higher degree of bendability (flexibility and ease of deformation) than, for example, a glass substrate, and be easily bent or folded.

The flexible substrate 16 is in contact with a region of the substrate non-coinciding portion 12 of the substrate 11a of the display panel 11 which region is closer to the edge in the Y-axis direction than the display driving component 15 is (that is, on the side opposite to the substrate 11b). The flexible substrate 16 is oriented to have a sheet surface with an edge that extends along the X axis. The flexible substrate 16 has a first end 16a in contact with a surface of the substrate 11a of the display panel 11. The flexible substrate 16 is bent to cover a side wall (not shown) of the chassis 27. The flexible substrate 16 has a second end 16b in contact with the control circuit substrate 17.

The control circuit substrate 17 is, as described above, attached to the back surface (that is, the outer surface opposite to the display panel 11) of the chassis 27 with use of, for example, a screw (not shown). The control circuit substrate 17 includes (i) a substrate made of paper phenol or glass epoxy resin, (ii) electronic components mounted on the substrate to supply various input signals to, for example, the display driving component 15, and (iii) a predetermined wiring pattern (conducting path; not shown) on the substrate.

The display device 10 includes a heat dissipation member 30 for increased heat dissipation. The heat dissipation member 30 is preferably made of a highly thermally conductive material. The heat dissipation member 30 is, for example, a graphite sheet. Graphite sheets have a thermal conductivity higher than metals with excellent thermal conductivity such as copper and aluminum, and have a density lower than such metals. Graphite sheets are highly effective as a member for diffusion and heat dissipation for use over a wide area, and are suitable for such purposes. The heat dissipation member 30 is preferably a graphite sheet having (i) a thermal conductivity of not less than 1500 W/mk and not more than 1700 W/mk in the surface direction and (ii) a density of not less than 1.8 g/cm$^2$ and not more than 2.0 g/cm$^2$. Further, the heat dissipation member 30 is preferably a graphite sheet having a thickness of not less than 10 μm and not more than 100 μm.

The heat dissipation member 30 integrally includes a display panel coinciding portion 30a, a connecting portion 30b, and a light source coinciding portion 30c. The display panel coinciding portion 30a is present on a portion of the substrate 11a which portion is opposite to the region in which the display driving component 15 is mounted. The display panel coinciding portion 30a covers the back surface of the substrate non-coinciding portion 12 substantially entirely. The display panel coinciding portion 30a has a front surface fixed to the back surface of the substrate non-coinciding portion 12 of the substrate 11a via an adhesive tape (not shown). The display panel coinciding portion 30a has a back surface fixed to the front surface of the LED substrate 22 via an adhesive tape (not shown). The display panel coinciding portion 30a covers the front surface of the LED substrate 22 entirely. The display panel coinciding portion 30a is, in other words, sandwiched between the substrate 11a and the LED substrate 22 and fixed to each of the substrate 11a and the LED substrate 22.

The display panel coinciding portion 30a is not necessarily present substantially entirely over that portion of the back surface of the substrate 11a which portion corresponds to the substrate non-coinciding portion 12. The display panel coinciding portion 30a may, for example, spread beyond the substrate non-coinciding portion 12 to the back surface of a region other than the substrate non-coinciding portion 12, or be present to cover only part of the back surface of the substrate non-coinciding portion 12.

The display panel coinciding portion 30a is, in other words, present to, for heat dissipation, at least cover the back surface of the region in which the display driving component 15 is mounted and to not cover the back surface of the display region (active area). The display panel coinciding portion 30a is not necessarily sandwiched entirely between the substrate 11a and the LED substrate 22, and may be sandwiched only partially therebetween. The display panel coinciding portion 30a may be in no contact with the LED substrate 22.

The connecting portion 30b connects, entirely across the X-axis direction, (i) an end of the display panel coinciding portion 30a which end extends in the X-axis direction with (ii) an end of the light source coinciding portion 30c which end extends in the X-axis direction. The connecting portion 30b is, as illustrated in FIG. 1, present more outwardly than the display panel 11 and the frame 26 (that is, to the left side in FIG. 1), and is curved in such a manner as to cover the widthwise side surface (which extends in the X-axis direction) of the frame 26.

The connecting portion 30b has a central portion (that is, a portion other than the boundary between the connecting portion 30b and the display panel coinciding portion 30a and the boundary between the connecting portion 30b and the light source coinciding portion 30c) that is not fixed to the backlight unit 20 and that is freely deformable. The central portion is longer than the distance between the front surface of the LED substrate 22 and the back surface of the reflecting sheet 25, and is apart from the corresponding side surface of the frame 26.

The connecting portion 30b is not necessarily apart from the side surface of the frame 26. The connecting portion 30b may extend along the side surface of the frame 26 or be only partially apart from the side surface of the frame 26 due to, for example, a design restriction. The connecting portion 30b may be partially in contact with the chassis 27 (which is positioned outside the frame 26) or with a housing (not shown) positioned outside the chassis 27.

The light source coinciding portion 30c is present on that side of the backlight unit 20 which is opposite to the display panel 11. That side of the backlight unit 20 which is opposite to the display panel 11 refers to a region below (in FIG. 1) the light source 21 and the light guide plate 23 in the thickness direction of the backlight unit 20 (that is, the Z-axis direction), the region not covering the side surface of the frame 26 (on the left side in FIG. 1).

The light source coinciding portion 30c is in the shape of a rectangle substantially equal in dimension to the reflecting sheet 25, and covers the back surface of the reflecting sheet 25 substantially entirely. Specifically, the light source coinciding portion 30c is fixed to the back surface (that is, the surface opposite to the light guide plate 23) of the reflecting sheet 25 via an adhesive tape (not shown). The light source coinciding portion 30c is separated from the chassis 27 by a gap and faces the bottom plate section 27a of the chassis 27. The backlight unit 20 may alternatively be configured such that the light source coinciding portion 30c is not separated from the chassis 27 by a gap and is in contact with both the reflecting sheet 25 and the bottom plate section 27a of the chassis 27. The light source coinciding portion 30c does not necessarily cover the back surface of the reflecting sheet 25 entirely, and may cover only part of the back surface of the reflecting sheet 25.

As described above, the heat dissipation member 30 includes (i) at a first end thereof, a display panel coinciding portion 30a fixed to the display panel 11, (ii) at a second end thereof, a light source coinciding portion 30c fixed to a portion of the backlight unit 20 which portion is opposite to the display panel 11 across the light source 21 and the light guide plate 23, and (iii) at a middle portion thereof, a connecting portion 30b apart from the display panel 11 and the frame 26. The connecting portion 30b has an opening formed by cutting off a portion of the connecting portion 30b, through which opening a protruding portion 22a protrudes that serves to supply, for example, electric power to the LED substrate 22.

The heat dissipation member 30 is not necessarily fixed with use of an adhesive tape, and may be provided with an adhesive layer or be fixed with use of an adhesive. Since the graphite sheet as the heat dissipation member 30 is extremely thin, the graphite sheet as the heat dissipation member 30 may, for example, be integrated with a supporting layer made of resin.

The graphite sheet described above is preferably as large in area as possible for improved diffusion and heat dissipation. The graphite sheet is preferably thin to allow the display device 10 to be small and thin. The graphite sheet preferably has a suitable thickness that is well balanced with heat dissipation.

The above configuration of the heat dissipation member 30 allows heat generated as the display driving component 15 is driven to be (i) transmitted via the substrate 11a to the display panel coinciding portion 30a of the heat dissipation member 30 and (ii) rapidly diffused and dissipated by the heat dissipation member 30, which has excellent thermal conductivity. The above configuration also allows heat generated by the light source 21 to be (i) transmitted via the reflecting sheet 25 to the light source coinciding portion 30c of the heat dissipation member 30 and (ii) rapidly diffused and dissipated toward the chassis 27. The above configuration also allows part of the heat transmitted to the display panel coinciding portion 30a and to the light source coinciding portion 30c to be (i) rapidly diffused to the connecting portion 30b and (ii) dissipated efficiently from the connecting portion 30b, which is surrounded by only a small number of components.

Figure 2:
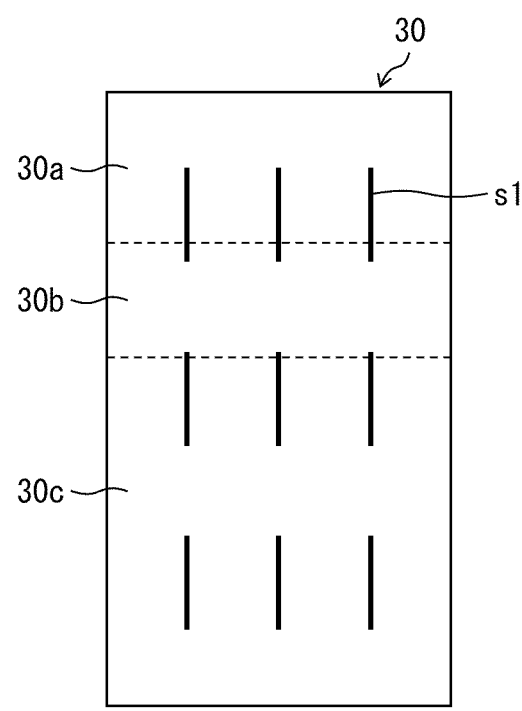
FIG. 2 is a diagram illustrating the configuration of a heat dissipation member included in the display device illustrated in FIG. 1.

The description below deals with the heat dissipation member 30, which has slits s1, with reference to FIG. 2. FIG. 2 is a diagram illustrating the configuration of the heat dissipation member 30 included in the display device 10 illustrated in FIG. 1. FIG. 2 illustrates a heat dissipation member 30 that has not been attached to the display device 10. The heat dissipation member 30, as illustrated in FIG. 2, has a plurality of slits s1. The slits s1 serve to discharge gas inside the heat dissipation member 30 to outside the heat dissipation member 30.

FIG. 2 illustrates the heat dissipation member 30 as having nine slits s1. The number of slits s1 that the heat dissipation member 30 has is not limited to any particular number as long as the slits s1 ensure heat dissipation by the heat dissipation member 30, do not impair the strength of the heat dissipation member 30, and prevent the heat dissipation member 30 from expanding when a yet-to-be-finished display device 10 (hereinafter referred to as "display device 10 intermediate") is subjected to vacuum drawing. The slits s1 may be present in the display panel coinciding portion 30a, the connecting portion 30b, and the light source coinciding portion 30c. This can prevent each of the display panel coinciding portion 30a, the connecting portion 30b, and the light source coinciding portion 30c from expanding when a display device 10 intermediate is subjected to vacuum drawing.

The slits s1 are present at a predetermined interval in the lengthwise direction of the heat dissipation member 30. The lengthwise direction of the heat dissipation member 30 refers to the lengthwise direction of the heat dissipation member 30 before the heat dissipation member 30 is attached to the display device 10. This means that when the heat dissipation member 30 has been attached to the display device 10, the slits s1 are present at a predetermined interval in the direction from the display panel coinciding portion 30a through the connecting portion 30b to the light source coinciding portion 30c. Specifically, the slits s1 are present at a predetermined interval along the Y axis in the display panel coinciding portion 30a, along the Z axis in the connecting portion 30b, and along the Y axis in the light source coinciding portion 30c in FIG. 1. This ensures both the heat dissipation and the strength of the heat dissipation member 30.

As described above, the heat dissipation member 30 is made of a highly thermally conductive material and has slits s1 for discharging gas inside the heat dissipation member 30 to outside the heat dissipation member 30. This configuration, for example, allows gas inside the heat dissipation member 30 to be discharged to outside the heat dissipation member 30 in a case where a display device 10 intermediate is subjected to vacuum drawing during production of the display device 10. This makes it possible to, when a display device 10 intermediate is subjected to vacuum drawing, prevent the heat dissipation member 30 from expanding and thereby improve the yield of production of the display device 10.

Method for Producing Display Device 10

Figure 3:
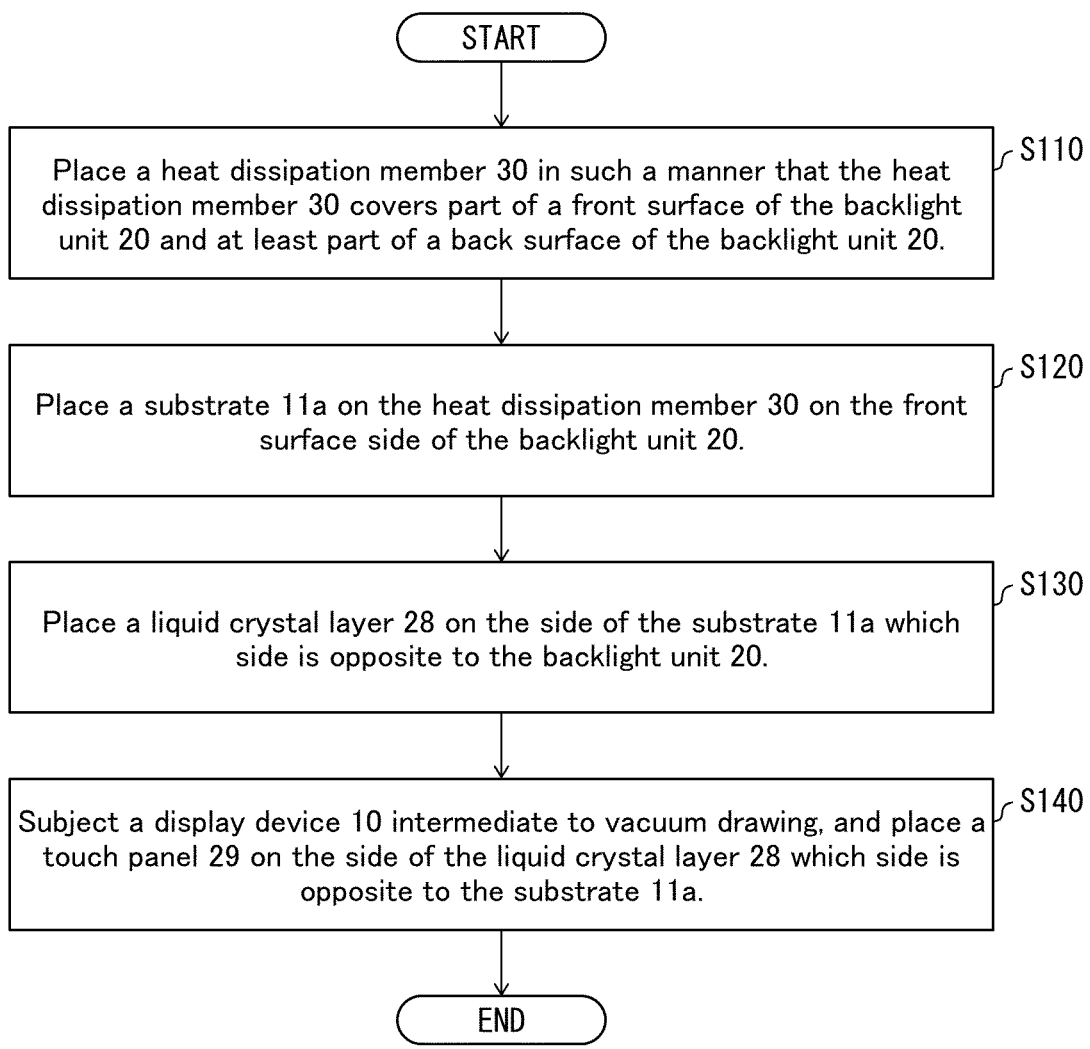
FIG. 3 is a flowchart that shows a method for producing the display device illustrated in FIG. 1.

FIG. 3 is a flowchart that shows a method for producing the display device 10 illustrated in FIG. 1. As illustrated in FIG. 3, the method for producing the display device 10 includes first placing a heat dissipation member 30 in such a manner that the heat dissipation member 30 covers part of the front surface of a backlight unit 20 and at least part of the back surface of the backlight unit 20 (step S110: step of placing a heat dissipation member). Specifically, a heat dissipation member 30 is placed so that the display panel coinciding portion 30a covers part of the front surface of a backlight unit 20 (that is, the front surface of the LED substrate 22) and that the light source coinciding portion 30c covers at least part of the back surface of the backlight unit 20 (that is, at least part of the back surface of the reflecting sheet 25). The heat dissipation member 30 is made of a highly thermally conductive material and has slits s1 described above.

The method includes, after placing a heat dissipation member 30 for the backlight unit 20, placing a substrate 11a on the heat dissipation member 30 on the front surface side of the backlight unit 20 (step S120: step of placing a substrate). Specifically, a substrate 11a is placed on the display panel coinciding portion 30a of the heat dissipation member 30 on the front surface side of the LED substrate 22 of the backlight unit 20.

The method includes, after placing a substrate 11a on the heat dissipation member 30 on the front surface side of the backlight unit 20, placing a liquid crystal layer 28 on the side of the substrate 11a which side is opposite to the backlight unit 20 (step S130). Specifically, a liquid crystal layer 28 is placed on the side of the substrate 11a which side is opposite to the backlight unit 20, that is, on the front surface side of the substrate 11a.

The method includes, after placing a liquid crystal layer 28 on the front surface side of the substrate 11a, subjecting a display device 10 intermediate to vacuum drawing and placing a touch panel 29 on the side of the liquid crystal layer 28 which side is opposite to the substrate 11a (step S140). Specifically, a display device 10 intermediate is subjected to vacuum drawing, and a touch panel 29 is placed on the side of the liquid crystal layer 28 which side is opposite to the substrate 11a, with a substrate 11b and a polarizing plate 13 between the touch panel 29 and the liquid crystal layer 28.

As described above, the production of the display device 10 involves a heat dissipation member 30 made of a highly thermally conductive material and having slits s1 for discharging gas inside the heat dissipation member 30 to outside the heat dissipation member 30. This makes it possible to, when a display device 10 intermediate is subjected to vacuum drawing, prevent the heat dissipation member 30 from expanding and thereby improve the yield of production of the display device 10.

Embodiment 2

Figure 4:
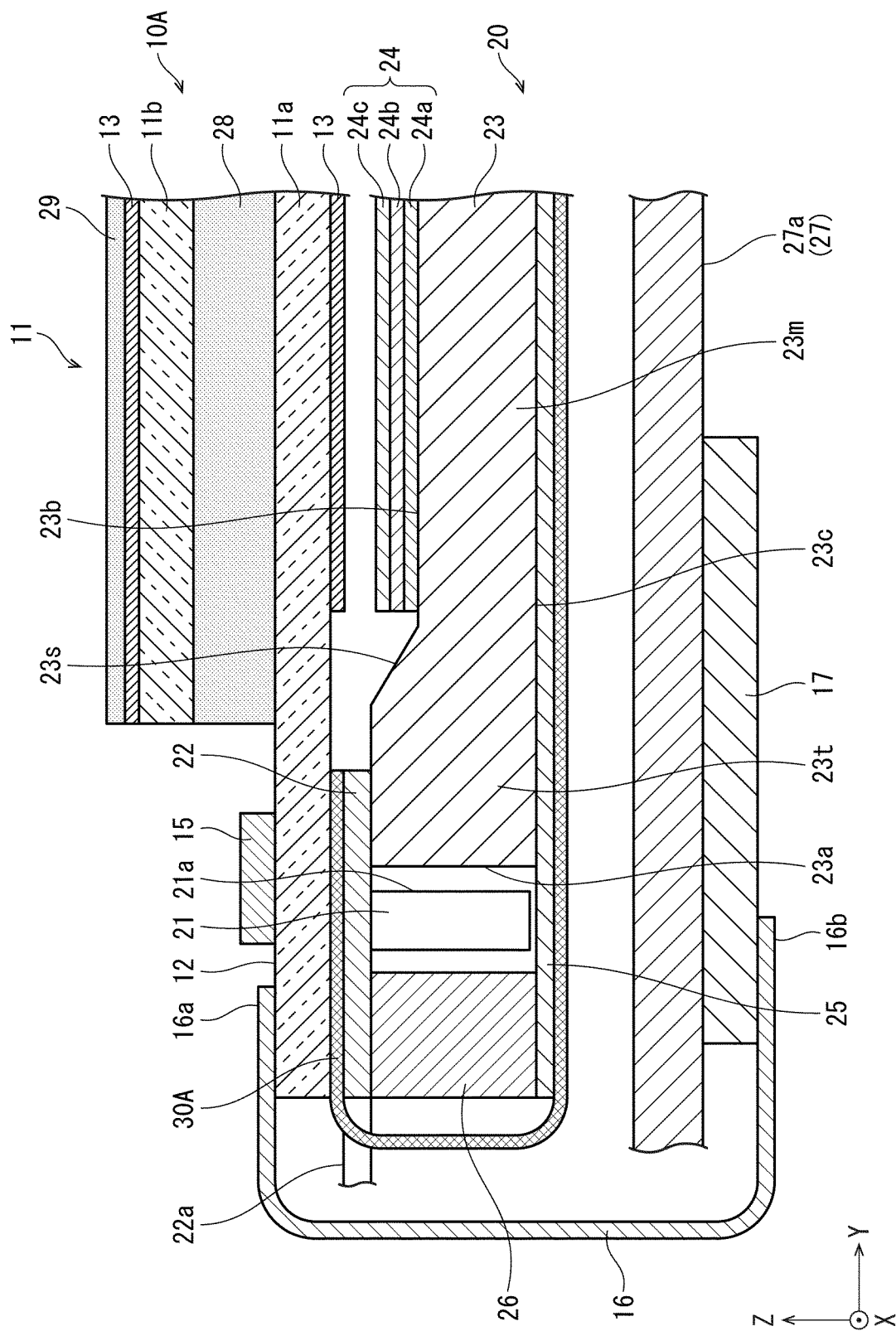
FIG. 4 is a cross-sectional diagram illustrating the configuration of a display device in accordance with Embodiment 2 of the present invention.

FIG. 4 is a cross-sectional diagram illustrating the configuration of a display device 10A in accordance with Embodiment 2 of the present invention. For convenience of explanation, any member of the present embodiment that is identical in function to a member described for any embodiment above is assigned a common reference sign and is not described here again.

The display device 10A, as illustrated in FIG. 4, differs from the display device 10 in that the heat dissipation member 30 is replaced with a heat dissipation member 30A. The heat dissipation member 30A is preferably made of a highly thermally conductive material whose volume in a non-vacuum state is maintained in a vacuum state. In other words, the volume of the heat dissipation member 30A in a non-vacuum state (for example, in air) is equal to the volume of the heat dissipation member 30A in a vacuum state. The heat dissipation member 30A contains no gas.

The heat dissipation member 30A, which meets the above condition, is preferably a metal foil excellent in thermal conductivity such as a copper foil, an aluminum foil, and an iron foil. The display device 10A is produced by a method that differs from the method for producing the display device 10 in that the heat dissipation member 30 is replaced with the heat dissipation member 30A.

As described above, the heat dissipation member 30A is made of a highly thermally conductive material whose volume in a non-vacuum state is maintained in a vacuum state. This makes it possible to, when a display device 10A intermediate is, for example, subjected to vacuum drawing during the production of the display device 10A, prevent the heat dissipation member 30A from expanding and thereby improve the yield of production of the display device 10A.

Embodiment 3

Figure 5:
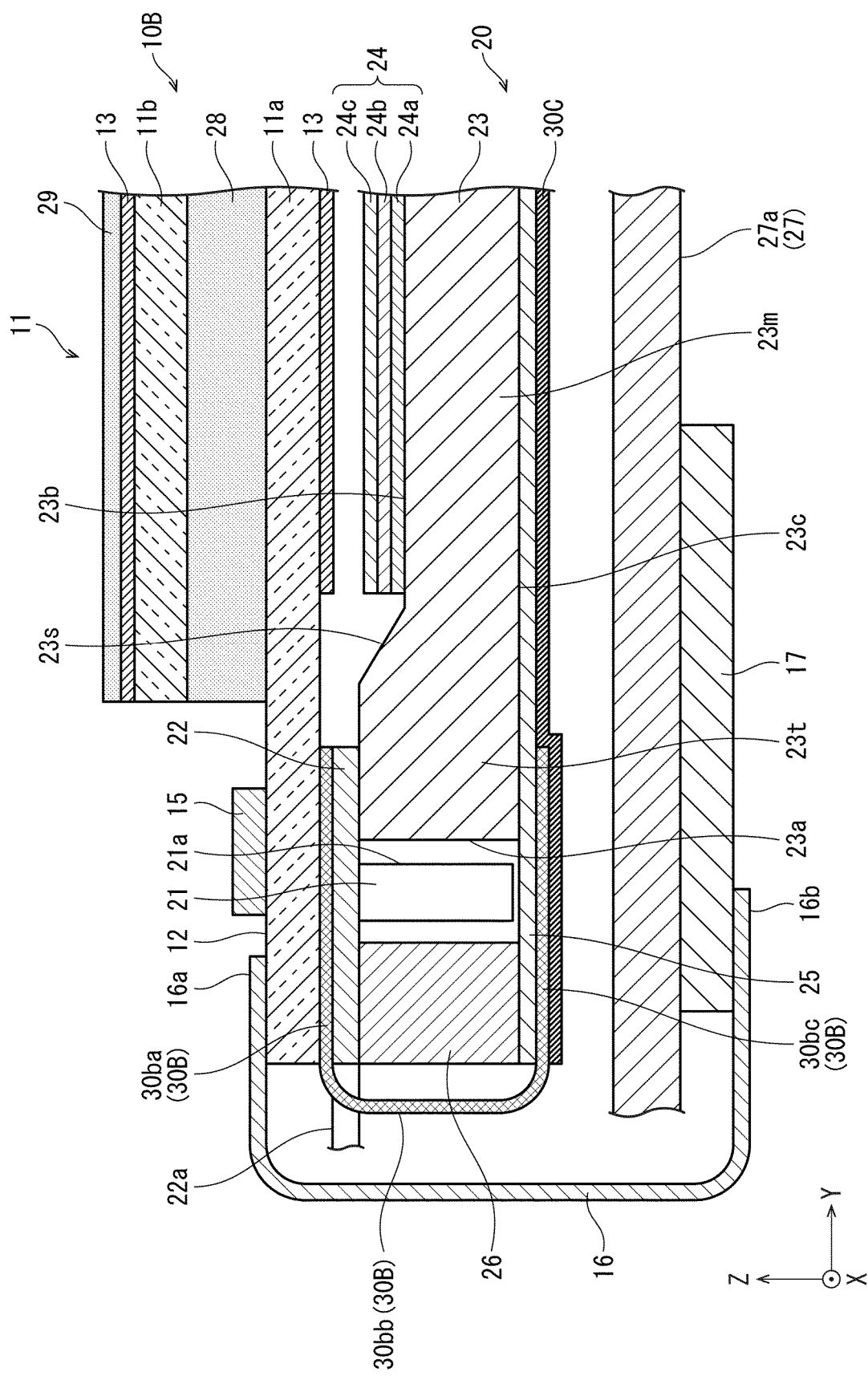
FIG. 5 is a cross-sectional diagram illustrating the configuration of a display device in accordance with Embodiment 3 of the present invention.

FIG. 5 is a cross-sectional diagram illustrating the configuration of a display device 10B in accordance with Embodiment 3 of the present invention. For convenience of explanation, any member of the present embodiment that is identical in function to a member described for any embodiment above is assigned a common reference sign and is not described here again.

The display device 10B, as illustrated in FIG. 5, differs from the display device 10 in that the heat dissipation member 30 is replaced with a heat dissipation member 30B and that the display device 10B includes a heat dissipation member 30C. The heat dissipation member 30B is made of the same material as that of the heat dissipation member 30A, but is shaped differently from the heat dissipation member 30 or 30A. The heat dissipation member 30C is made of the same material as that of the heat dissipation member 30, but is shaped differently from the heat dissipation member 30. The heat dissipation member 30C may have no slits s1 described above.

The heat dissipation member 30B integrally includes a display panel coinciding portion 30ba, a connecting portion 30bb, and a light source coinciding portion 30bc. The display panel coinciding portion 30ba and the connecting portion 30bb have respective shapes identical to the respective shapes of the display panel coinciding portion 30a and the connecting portion 30b of the heat dissipation member 30, whereas the light source coinciding portion 30bc is shaped differently from the light source coinciding portion 30c of the heat dissipation member 30.

The light source coinciding portion 30bc is in the shape of a rectangle smaller in dimension than the reflecting sheet 25, and covers part of the back surface of the reflecting sheet 25. The heat dissipation member 30C covers the back surface of the light source coinciding portion 30bc and that portion of the back surface of the reflecting sheet 25 which is not covered by the light source coinciding portion 30bc. The heat dissipation member 30C is separated from the chassis 27 by a gap and faces the bottom plate section 27a of the chassis 27. The backlight unit 20 may alternatively be configured such that the heat dissipation member 30C is not separated from the chassis 27 by a gap and is in contact with both the reflecting sheet 25 and the bottom plate section 27a of the chassis 27.

That portion of the heat dissipation member 30C which is present on the back surface side of the reflecting sheet 25 preferably has a back surface with an area larger than the area of the back surface of the light source coinciding portion 30bc, which is present on the back surface side of the reflecting sheet 25. This configuration allows the heat dissipation member 30C, which is higher in heat dissipation than the heat dissipation member 30B, to occupy a larger area on the back surface side of the reflecting sheet 25, and thereby further increases heat dissipation by the display device 10B.

Method for Producing Display Device 10B

FIG. 6 is a flowchart that shows a method for producing the display device 10B illustrated in FIG. 5. As illustrated in FIG. 6, the method for producing the display device 10B includes first placing a heat dissipation member 30B in such a manner that the heat dissipation member 30B covers part of the front surface of a backlight unit 20 and part of the back surface of the backlight unit 20 (step S210). Specifically, a heat dissipation member 30B is placed so that the display panel coinciding portion 30ba covers part of the front surface of a backlight unit 20 (that is, the front surface of the LED substrate 22) and that the light source coinciding portion 30bc covers part of the back surface of the backlight unit 20 (that is, part of the back surface of the reflecting sheet 25). The heat dissipation member 30B is made of a highly thermally conductive material whose volume in a non-vacuum state is maintained in a vacuum state.

The method includes, after placing a heat dissipation member 30B for the backlight unit 20, placing a substrate 11a on the heat dissipation member 30B on the front surface side of the backlight unit 20 (step S220). Specifically, a substrate 11a is placed on the display panel coinciding portion 30ba of the heat dissipation member 30B on the front surface side of the LED substrate 22 of the backlight unit 20.

The method includes, after placing a substrate 11a on the heat dissipation member 30B on the front surface side of the backlight unit 20, carrying out the step S230, which is identical to the step S130.

The method includes, after carrying out the step S230, carrying out the step S240, which is identical to the step S140. The member includes, after carrying out the step S240, placing a heat dissipation member 30C in such a manner that the heat dissipation member 30C covers the back surface of the heat dissipation member 30B and that portion of the back surface of the backlight unit 20 which is not covered by the heat dissipation member 30B (step S250). Specifically, a heat dissipation member 30C is placed in such a manner as to cover the back surface of the light source coinciding portion 30bc of the heat dissipation member 30B and that portion of the back surface of the reflecting sheet 25 of the backlight unit 20 which is not covered by the light source coinciding portion 30bc. The heat dissipation member 30C is a graphite sheet, which has a thermal conductivity higher than metals with excellent thermal conductivity such as copper and aluminum.

As described above, (i) before a display device 10B intermediate is subjected to vacuum drawing, a heat dissipation member 30B is placed that is made of a highly thermally conductive material whose volume in a non-vacuum state is maintained in a vacuum state, and (ii) after the display device 10B intermediate is subjected to vacuum drawing, a heat dissipation member 30C is placed in the form of a graphite sheet, which has a thermal conductivity higher than metals with excellent thermal conductivity such as copper and aluminum.

This makes it possible to, when a display device 10B intermediate is subjected to vacuum drawing, prevent the heat dissipation member 30B from expanding. Further, placing a heat dissipation member 30C after the display device 10B intermediate is subjected to vacuum drawing can prevent the heat dissipation member 30C from expanding and further increase heat dissipation by the display device 10B.

[Recap]

A display device (10) in accordance with a first aspect of the present invention includes: a display panel (11) including a substrate (11a) and a display driving component (15) mounted on the substrate; a backlight unit (20) including a light source (21) and facing the substrate; and a heat dissipation member (30) integrally including: a display panel coinciding portion (30a) on a surface of the substrate which surface is opposite to a region in which the display driving component is mounted; a light source coinciding portion (30c) present on a side of the backlight unit which side is opposite to the display panel; and a connecting portion (30b) connecting the display panel coinciding portion and the light source coinciding portion with each other, the heat dissipation member being made of a highly thermally conductive material and having slits (s1) for discharging gas inside the heat dissipation member to outside the heat dissipation member.

With the above configuration, the heat dissipation member is made of a highly thermally conductive material and has slits for discharging gas inside the heat dissipation member to outside the heat dissipation member. This configuration, for example, allows gas inside the heat dissipation member to be discharged to outside the heat dissipation member in a case where a display device intermediate is subjected to vacuum drawing during production of the display device. This makes it possible to, when a display device intermediate is subjected to vacuum drawing, prevent the heat dissipation member from expanding and thereby improve the yield of production of the display device.

A display device (10) in accordance with a second aspect of the present invention is configured as in the first aspect, and may preferably be further configured such that the slits (s1) are present at a predetermined interval in a direction from the display panel coinciding portion (30a) through the connecting portion (30b) to the light source coinciding portion (30c).

With the above configuration, the slits are present at a predetermined interval in a direction from the display panel coinciding portion of the heat dissipation member through the connecting portion to the light source coinciding portion. This ensures both the heat dissipation and the strength of the heat dissipation member.

A display device (10A) in accordance with a third aspect of the present invention includes: a display panel (11) including a substrate (11a) and a display driving component (15) mounted on the substrate; a backlight unit (20) including a light source (21) and facing the substrate; and a heat dissipation member (30A) integrally including: a display panel coinciding portion on a surface of the substrate which surface is opposite to a region in which the display driving component is mounted; a light source coinciding portion present on a side of the backlight unit which side is opposite to the display panel; and a connecting portion connecting the display panel coinciding portion and the light source coinciding portion with each other, the heat dissipation member being made of a highly thermally conductive material whose volume in a non-vacuum state is maintained in a vacuum state.

With the above configuration, the heat dissipation member is made of a highly thermally conductive material whose volume in a non-vacuum state is maintained in a vacuum state. As described above, this makes it possible to, when a display device intermediate is, for example, subjected to vacuum drawing during the production of the display device, prevent the heat dissipation member from expanding and thereby improve the yield of production of the display device.

A method in accordance with a fourth aspect of the present invention for producing a display device (10) is a method for producing a display device including (i) a display panel (11) including a substrate (11a) and a display driving component (15) mounted on the substrate and (ii) a backlight unit (20) including a light source (21) and facing the substrate, the method including the steps of: placing a heat dissipation member (30) in such a manner that the heat dissipation member covers part of a front surface of the backlight unit and at least part of a back surface of the backlight unit; and placing the substrate on the heat dissipation member on a side of the front surface of the backlight unit, the heat dissipation member being made of a highly thermally conductive material and having slits (s1) for discharging gas inside the heat dissipation member to outside the heat dissipation member.

With the above configuration, the production of the display device involves a heat dissipation member made of a highly thermally conductive material and having slits for discharging gas inside the heat dissipation member to outside the heat dissipation member. This makes it possible to, when a display device intermediate is subjected to vacuum drawing, prevent the heat dissipation member from expanding and thereby improve the yield of production of the display device.

A method in accordance with a fifth aspect of the present invention for producing a display device (10) is a method for producing a display device including (i) a display panel (11) including a substrate (11a) and a display driving component (15) mounted on the substrate and (ii) a backlight unit (20) including a light source (21) and facing the substrate, the method including the steps of: placing a heat dissipation member (30A) in such a manner that the heat dissipation member covers part of a front surface of the backlight unit and at least part of a back surface of the backlight unit; and placing the substrate on the heat dissipation member on a side of the front surface of the backlight unit, the heat dissipation member being made of a highly thermally conductive material whose volume in a non-vacuum state is maintained in a vacuum state.

With the above configuration, the heat dissipation member for production of the display device is made of a highly thermally conductive material whose volume in a non-vacuum state is maintained in a vacuum state. As described above, this makes it possible to, when a display device intermediate is subjected to vacuum drawing, prevent the heat dissipation member from expanding and thereby improve the yield of production of the display device.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 10, 10A, 10B Display device
11 Display panel
11a, 11b Substrate
12 Substrate non-coinciding portion
13 Polarizing plate
15 Display driving component
16 Flexible substrate
16a, 16b End
17 Control circuit substrate
20 Backlight unit
21 Light source
21a Light emission surface
22 LED substrate
22a Protruding portion
23 Light guide plate
23a Light entrance surface
23b Light exit surface
23c Reflective surface
23m Body
23s Slope portion
23t Thick portion
24 Optical sheet
24a Diffusing sheet
24b Lens sheet
24c Reflective polarizing sheet
25 Reflecting sheet
26 Frame
27 Chassis
27a Bottom plate section
28 Liquid crystal layer
29 Touch panel
30, 30A, 30B, 30C Heat dissipation member
30a, 30ba Display panel coinciding portion
30b, 30bb Connecting portion
30c, 30bc Light source coinciding portion
s1 Slit

The invention claimed is:
1. A display device, comprising:
a display panel including a substrate and a display driving component mounted on the substrate;

a backlight unit including a light source and facing the substrate; and a heat dissipation member integrally including:
- a display panel coinciding portion on a surface of the substrate which surface is opposite to a region in which the display driving component is mounted;
- a light source coinciding portion present on a side of the backlight unit which side is opposite to the display panel; and
- a connecting portion connecting the display panel coinciding portion and the light source coinciding portion with each other, the heat dissipation member being made of a highly thermally conductive material and having slits for discharging gas inside the heat dissipation member to outside the heat dissipation member, the slits being present in the display panel coinciding portion, the connecting portion, and the light source coinciding portion, and the slits including at least one of a first slit and a second slit, the first slit straddling the display panel coinciding portion and the connecting portion, the second slit straddling the connecting portion and the light source coinciding portion.

2. The display device according to claim 1, wherein
the slits are present at a predetermined interval in a direction from the display panel coinciding portion through the connecting portion to the light source coinciding portion.

3. The display device according to claim 1, wherein
the heat dissipation member is made of a highly thermally conductive material whose volume in a non-vacuum state is maintained in a vacuum state.

4. A method for producing a display device including (i) a display panel including a substrate and a display driving component mounted on the substrate and (ii) a backlight unit including a light source and facing the substrate, the method comprising the steps of:

placing a heat dissipation member in such a manner that the heat dissipation member covers part of a front surface of the backlight unit and at least part of a back surface of the backlight unit, the heat dissipation member integrally including:
- a display panel coinciding portion;
- a light source coinciding portion; and
- a connecting portion connecting the display panel coinciding portion and the light source coinciding portion with each other; and placing the substrate on the heat dissipation member on a side of the front surface of the backlight unit, the heat dissipation member being made of a highly thermally conductive material and having slits for discharging gas inside the heat dissipation member to outside the heat dissipation member, the slits being present in the display panel coinciding portion, the connecting portion, and the light source coinciding portion, and the slits including at least one of a first slit and a second slit, the first slit straddling the display panel coinciding portion and the connecting portion, the second slit straddling the connecting portion and the light source coinciding portion.

5. The method according to claim 4, wherein
the heat dissipation member is made of a highly thermally conductive material whose volume in a non-vacuum state is maintained in a vacuum state.

* * * * *